Dec. 21, 1965  P. A. BERTRAND  3,224,407
TRACTOR VEHICLE
Filed Oct. 27, 1964  5 Sheets-Sheet 1
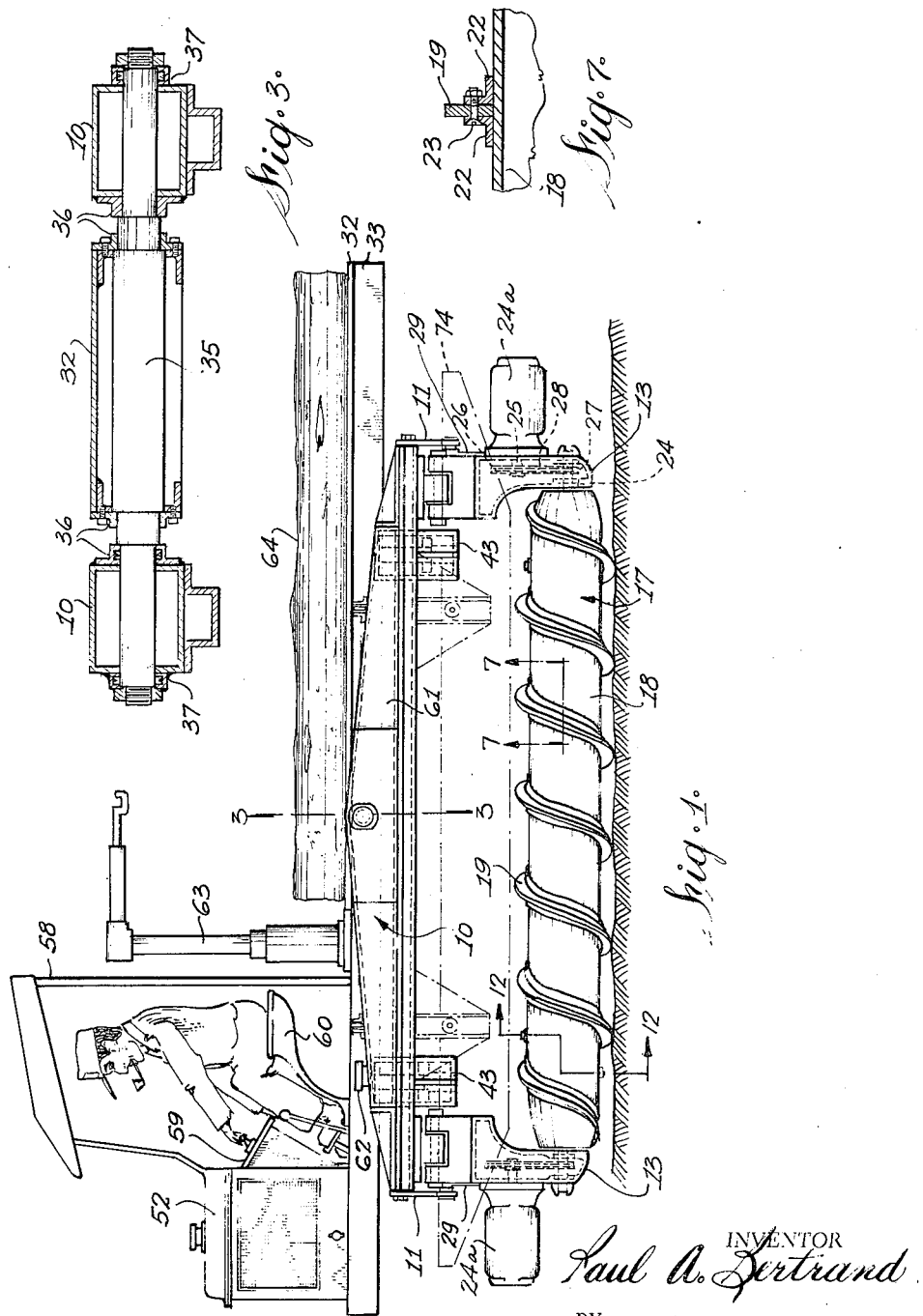
INVENTOR
Paul A. Bertrand
BY Harold Q. Wei
PATENT AGENT

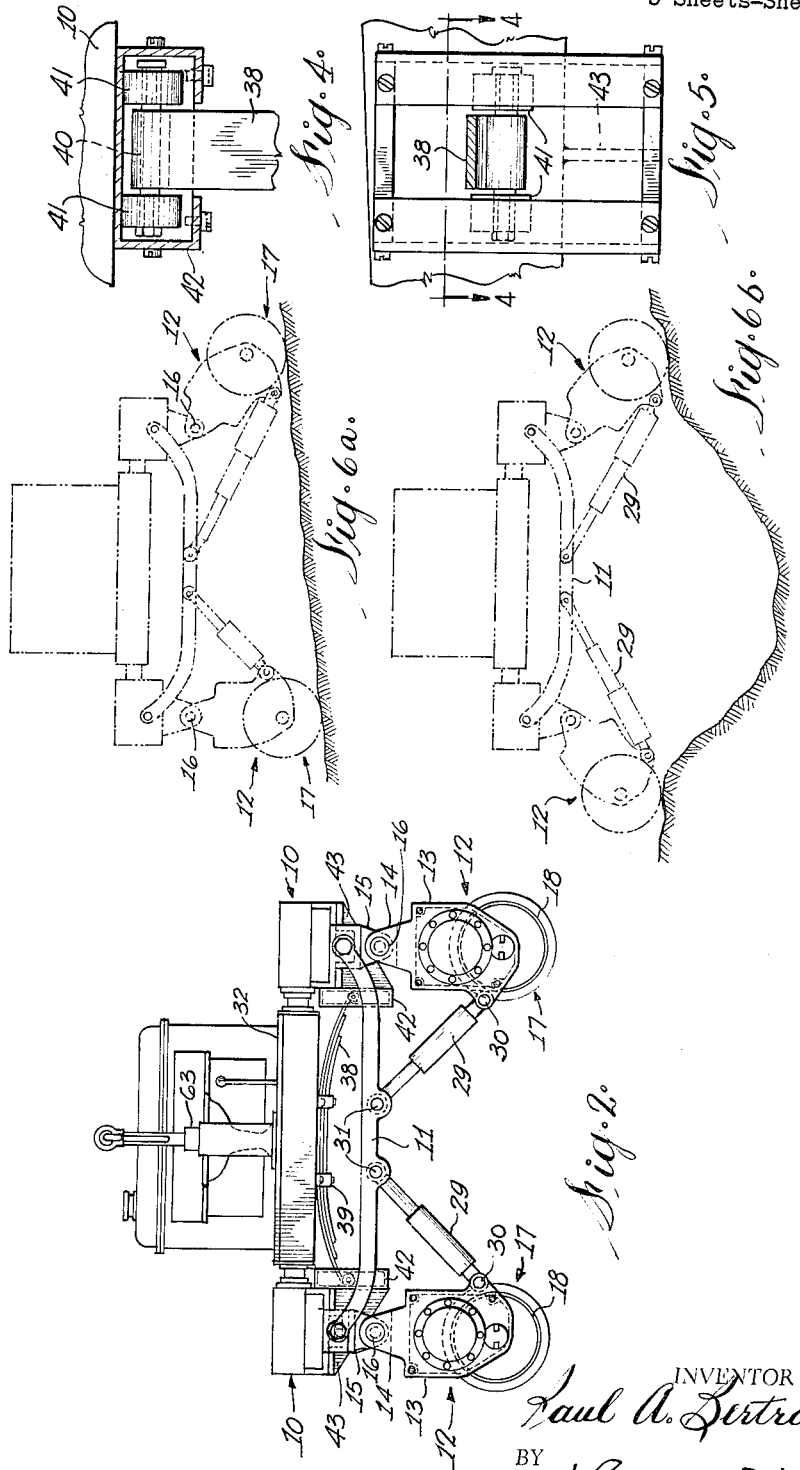

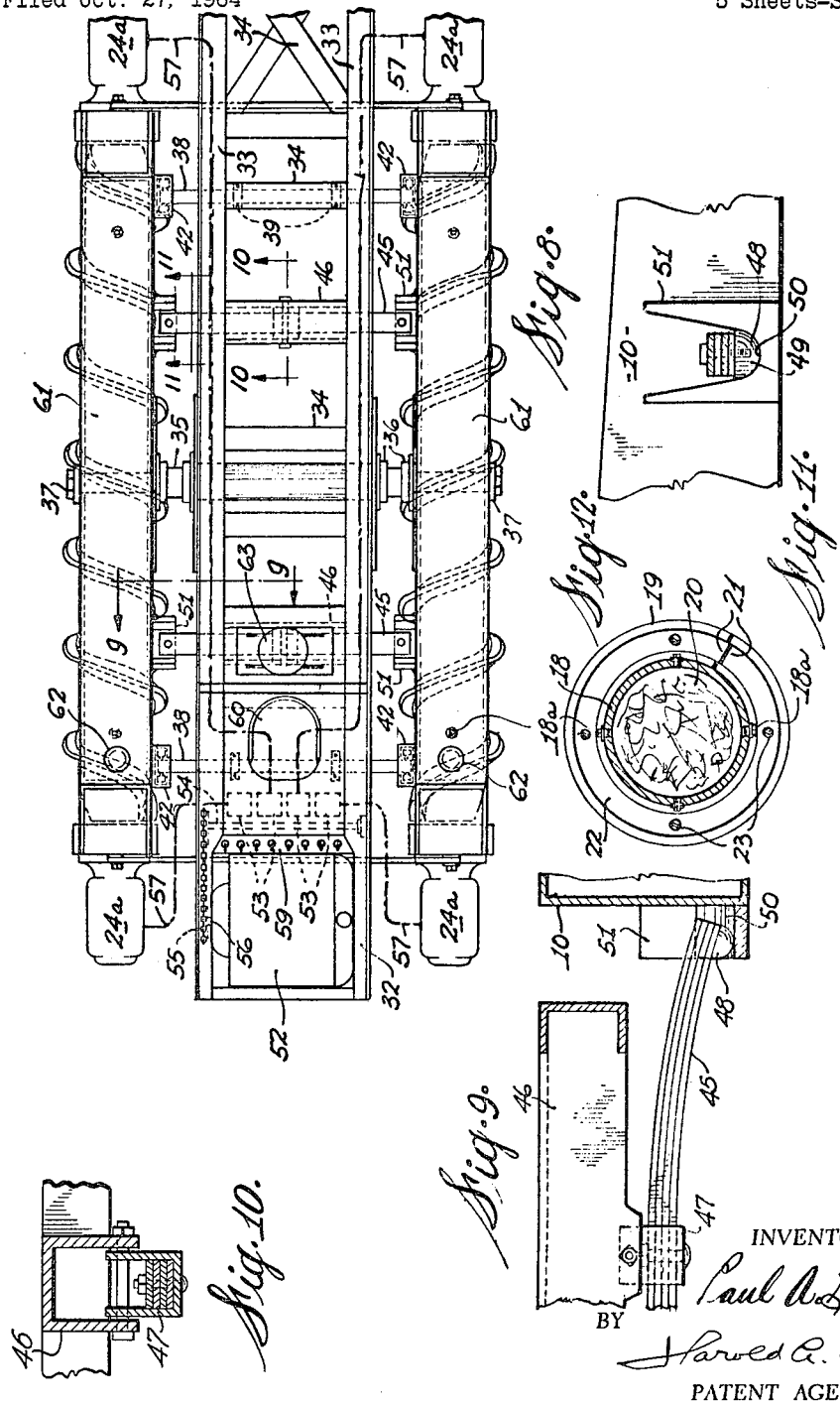

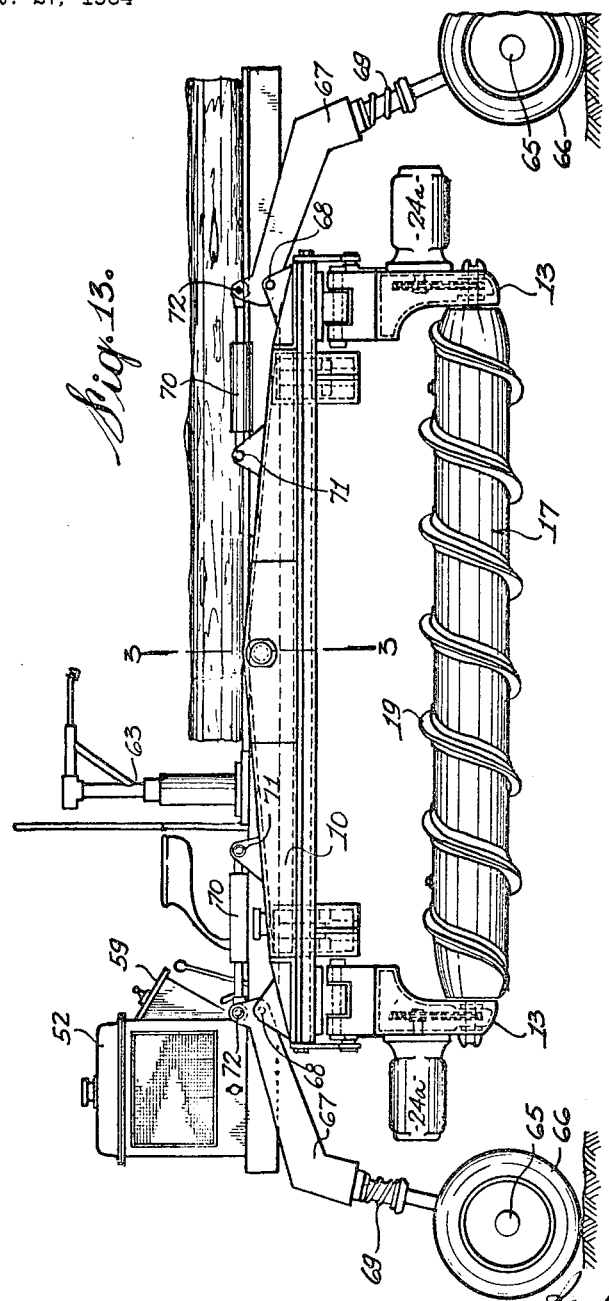

Dec. 21, 1965   P. A. BERTRAND   3,224,407
TRACTOR VEHICLE
Filed Oct. 27, 1964   5 Sheets-Sheet 5
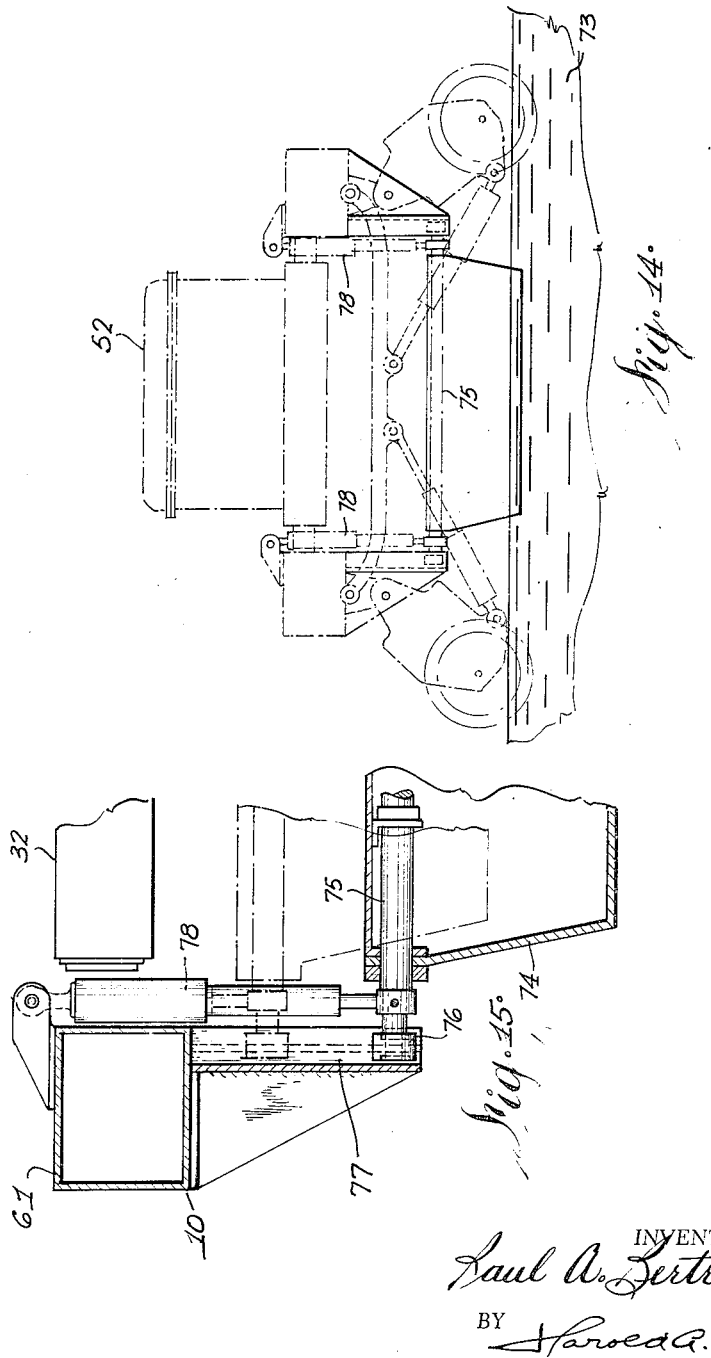
INVENTOR
Paul A. Bertrand
BY Harold A. Weir
PATENT AGENT

United States Patent Office 3,224,407
Patented Dec. 21, 1965

3,224,407
TRACTOR VEHICLE
Paul A. Bertrand, Rolphton, Ontario, Canada
Filed Oct. 27, 1964, Ser. No. 406,719
9 Claims. (Cl. 115—1)

This invention relates to load-bearing self-propelled vehicles of tractor type.

In many types of commercial operations, the need for a load-bearing vehicle which is capable of negotiating rough and swampy terrain is evident. In fact, many such operations must be curtailed because it is not economically feasible to clear or treat a particular land surface in such a manner that it can be negotiated by available vehicles. An example of one such operation is that associated with the logging industry. In that industry it is common practice to construct or clear temporary roadways to permit passage of trucks adapted to be loaded with logs for transportation to appropriate areas. Obviously, the formation of such roadways is frequently a very costly proceeding. Moreover, many useful stands of trees are often by-passed completely because the expense of constructing suitable roadways leading to and from such stands is so great that the logging thereof becomes uneconomical.

It is an object of this invention to provide a self-propelled vehicle of tractor type which is capable of bearing and transporting heavy loads over rough and uneven terrain as well as over swampy and like areas.

Another object is to provide a self-propelled vehicle of tractor type the ground-engaging elements of which are capable of adjustment to facilitate passage of the vehicle over uneven terrain.

Another object is to provide a self-propelled vehicle of tractor type which is provided with float means to support the vehicle in water or under watery conditions.

A basic feature of the present invention resides in the fact that the vehicle in accordance therewith includes a load-bearing platform which is arranged to maintain an approximate horizontal position and thus a stable load-bearing condition regardless of the roughness or unevenness of the terrain over which the vehicle travels.

To this end, the vehicle comprises a chassis and a load-bearing platform mounted on the chassis. Propulsion means for the vehicle comprises a pair of traction devices each having a cylinder and a helical blade thereon. Each traction device is rotatably mounted in supporting frames by means of spindles thereon. The supporting frames are pivotally mounted on the chassis on an axis parallel to the axis of the cylinders which extends longitudinally of the vehicle. Means are provided for swinging each traction device, independently of the other, about the axis of its supporting frames.

The invention further resides in a pivotal mounting for the load-bearing platform including a shaft extending transversely of the chassis and journalled thereon, the platform being carried by the shaft for tilting movement thereon. The end portions of the platform are supported on transversely extending springs. Each end of each spring is provided with a rail-engaging member which has sliding movement perpendicularly of the chassis in a guide rail fixed to the chassis.

The invention will be described with reference to the accompanying drawings, in which FIGURE 1 is a side elevation of a vehicle in accordance with the invention, FIGURE 2 is a front elevation of the vehicle, FIGURE 3 is a section on line 3—3 of FIGURE 1, FIGURE 4 is a sectional plan view, on line 4—4 of FIGURE 5, of a spring mounting connection, FIGURE 5 is a side elevation of the spring mounting connection of FIGURE 4, FIGURE 6a is a front elevation, in phantom, showing one adjusted position of the vehicle, FIGURE 6b is a front elevation, in phantom, showing another adjusted position of the vehicle, FIGURE 7 is a section on line 7—7 of FIGURE 1, FIGURE 8 is a plan view of the vehicle, FIGURE 9 is a section on line 9—9 of FIGURE 8, FIGURE 10 is a section on line 10—10 of FIGURE 8, FIGURE 11 is a section on line 11—11 of FIGURE 8, FIGURE 12 is a transverse sectional view of a traction element, FIGURE 13 is a side elevation of a modified form of vehicle, FIGURE 14 is an end elevation of another modified form of vehicle, and FIGURE 15 is an enlarged partial sectional end elevation of the vehicle shown in FIGURE 14.

Referring to the drawings, the main frame or chassis of the vehicle comprises a pair of longitudinally extending beams 10 connected together by end frame members 11. The main frame is supported on a pair of traction assemblies 12 each of which is pivotally connected to a beam 10 as by means of a pair of supporting frames 13, an arm 14 on each frame 13, a pair of brackets 15 fixed to the beam 10, and a pivot pin 16 connecting each arm with a bracket 15.

A traction device 17 is carried by each pair of frames 13 and comprises a drum or cylinder 18 having a helical blade 19 thereon. Each cylinder 18 is of buoyant character and preferably is hollow, as shown in FIGURE 12. While the cylinder may be simply filled with air, it is desirably filled with a foam-in-place plastic 20 through plugged openings 18a. Also, as indicated in FIGURE 12, the blade 19 is desirably formed in a plurality of sections with abutting end edges 21 whereby damaged sections may be removed and replaced to avoid the necessity of replacing the entire blade. To this end, the blade sections are removably mounted on the cylinder as by means of lugs 22 fixed to the cylinder and bolts 23 (FIGURE 7).

Each cylinder 18 is provided at each end with an axial spindle 24 which is journalled in supporting frame 13. Means for driving the traction devices for rotation about the axis thereof comprises a hydraulic motor 24 mounted on each frame 13, a shaft 25 driven by the motor, sprocket 26 on shaft 25, sprocket 27 on spindle 24, and chain 28.

Means are provided for adjusting independently the lateral position of each traction device with respect to the other. Such means comprises a hydraulic cylinder 29 having one end pivotally connected at 30 to each supporting frame 13 and its other end pivotally connected at 31 to a frame member 11. FIGURES 6a and 6b illustrate sample positions to which the traction devices may be moved.

A load-bearing platform 32 is mounted on the main frame of the vehicle and, as shown, comprises a pair of longitudinally extending bars 33 and a plurality of cross members 34 fixed thereto. Platform 32 is pivotally mounted for limited swinging movement about an axis extending transversely of the vehicle and located in the midsection area of the platform. To this end, the platform is pivotally mounted on a shaft 35 by means of bearing brackets 36 and the end portions of the shaft are journalled in bearing blocks 37 fixed to beams 10.

Each end portion of the platform is resiliently supported to permit limited tilting movement thereof by means of a leaf spring 38 mounted on a cross member 34 as by brackets 39. On each end of the spring is mounted a pin 40 which carries a pair of rollers 41 disposed in a guide rail or housing 42 fixed to a beam 10 as by a supporting web 43. Housing 42 has an opening 44 for passage of the spring 38. It will be apparent that the spring and rollers have limited up and down movement in the housing which, however, retains therein the rollers and end of the spring.

Means are preferably provided for imparting added support to the platform and comprises a second pair of leaf springs 45 each located between the pivotal axis of the platform and a spring 38. Each spring 45 is fixed at its midsection by means of bracket members 46 and 47 to a cross member 34. Each end of spring 45 has fixed thereto a shoe 48, having a rounded or semi-spherical surface 49 seated on a complementary concave surface 50 of a spring support 51 fixed to a beam 10. The spring mounting described permits limited transverse spreading movement of the spring as well as limited rotative movement of the spring about its longitudinal axis.

The motive power for the vehicle comprises an engine (preferably diesel) 52 mounted on the forward end of platform 32, a plurality of hydraulic pumps 53 driven by means of a shaft 54 and chain 55 from the engine drive shaft 56 (FIGURE 8), and hydraulic fluid lines 57 leading from the pumps to the motors 24. An operator's cab is indicated at 58 and is provided with a control panel 59 and a seat 60.

Fuel is preferably carried in a pair of elongated tanks 61, each mounted on top of a beam 10 and provided with a capped filler tube 62.

A conventional power-operated log handling device 63 may be mounted on the platform 32, the entire rearward portion of which is free for reception of logs 64.

Referring to FIGURE 13, there is illustrated therein an attachment designed to permit convenient towing of the vehicle when it is not in operation. This attachment comprises a pair of axles 65, each supported on a pair of wheels 66, and each carried by a pair of legs 67 pivotally mounted at 68 on a beam 10. Each leg may be provided with cushioning spring sections 69. Each pair of legs is adapted to be lowered into vehicle-supporting position (FIGURE 13) or raised into inoperative position by means of a hydraulic cylinder 70 pivotally connected to the main frame at 71 and to legs 67 at 72.

Referring to FIGURES 14 and 15, an attachment is therein illustrated for floatingly supporting the vehicle on a body of water 73. Such attachment comprises a buoyant pontoon 74 suspended from rods 75. Each rod has a head 76 mounted for up and down sliding movement in a guide rail 77 fixed to a beam 10. The pontoon is adapted to be lowered into float position or raised into inoperative position by means of hydraulic cylinders 78 connected to rods 75.

A most important characteristic of the invention resides in the fact that the load-bearing platform 32 maintains an approximately level position regardless of the uneven terrain traversed by the vehicle whereby it is capable of transporting heavy loads without danger of dislodgment or shifting thereof or of the imposition of undue strain on the vehicle. One feature of the apparatus described that contributes greatly to the stable positioning of the platform 32 is the pivotal mounting thereof since, obviously, should the front or rear end of the vehicle dip downwardly into a hollow in the terrain, the platform 32 will tend to remain in a horizontal position. The other feature that acts to compensate for sidewise dipping of the vehicle resides in the provision of means for independent adjustment of the lateral relation of the traction devices 17 as graphically illustrated in FIGURES 6a and 6b.

It will be apparent that the vehicle described may be operated to move it in a sidewise or lateral direction by sidewise manipulation of the traction devices 17.

I claim:

1. A vehicle comprising a chassis, a load-bearing platform mounted on said chassis, and propulsion means for said vehicle comprising a pair of traction devices each having a cylinder and a helical blade thereon, each said cylinder having axial spindles and a pair of supporting frames having said spindles journalled therein, each said pair of supporting frames being pivotally mounted on said chassis on an axis parallel to the axis of said cylinders and extending longitudinally of said vehicle, means for applying rotative movement to said cylinders, and independent means for swinging each of said cylinders about the axis of its said supporting frames.

2. A vehicle as defined in claim 1, wherein said last-mentioned means comprises a hydraulic cylinder pivotally connected to each of said supporting frames, each said hydraulic cylinder having a pivotal connection with said chassis.

3. A vehicle as defined in claim 1, including driving means for said cylinders comprising a hydraulic motor drivably connected to each said spindle, a hydraulic pump having a hydraulic connection with each said motor, and an engine mounted on said chassis and drivably connected to said pumps.

4. A vehicle as defined in claim 1, each said cylinder being hollow and having a filling therein of foam-in-place plastic composition.

5. A vehicle as defined in claim 1, each said helical blade having a plurality of sections in end to end relation, each said section being removably mounted on said cylinder.

6. A vehicle as defined in claim 1, including a shaft extending transversely of said chassis and journalled thereon, said platform being carried by said shaft for tilting movement thereon, a spring fixed to said platform adjacent each end thereof, a plurality of guide rails fixed to and extending perpendicularly of said chassis, each said spring having a rail-engaging member fixed to each end thereof, each said rail-engaging member being retained in one of said guide rails and having sliding movement in said rail in a direction perpendicularly of said chassis.

7. A vehicle as defined in claim 6, including a second pair of springs each fixed to said platform and extending transversely thereof, each of said second springs having a shoe fixed to each end thereof, and a plurality of spring supports fixed to said chassis, each said support having a seat, each said spring shoe being slidably and tiltably seated on one of said seats.

8. A vehicle as defined in claim 1, including a wheeled support therefor comprising a pair of wheeled axles, a pair of legs pivotally mounted on said chassis and carrying each of said axles, and hydraulic cylinder means for imparting swinging movement to said axles.

9. A vehicle as defined in claim 1, including a float therefor comprising a pontoon, means suspending said pontoon from said chassis, and hydraulic power means for raising and lowering said pontoon with respect to said chassis.

References Cited by the Examiner

UNITED STATES PATENTS 1,087,372    2/1914    Hoines _____ 180—3
3,123,039    3/1964    Bridwell _____ 115—1

FERGUS S. MIDDLETON, *Primary Examiner.*

ANDREW H. FARRELL, *Examiner.*